(12) United States Patent
Sun

(10) Patent No.: US 9,959,537 B2
(45) Date of Patent: May 1, 2018

(54) PORTABLE ELECTRONIC CARD SYSTEM AND METHOD FOR MANUFACTURING A REWRITABLE PLASTIC CARD

(71) Applicant: Pinsheng Sun, Kaohsiung (TW)

(72) Inventor: Pinsheng Sun, Kaohsiung (TW)

( * ) Notice: Subject to any disclaimer, the term of this patent is extended or adjusted under 35 U.S.C. 154(b) by 260 days.

(21) Appl. No.: 14/192,146

(22) Filed: Feb. 27, 2014

(65) Prior Publication Data

US 2015/0242845 A1    Aug. 27, 2015

(51) Int. Cl.
G06Q 20/34    (2012.01)
H04L 29/06    (2006.01)

(52) U.S. Cl.
CPC ......... *G06Q 20/355* (2013.01); *H04L 63/083* (2013.01)

(58) Field of Classification Search
CPC .................... G06Q 20/355; H04L 63/083
See application file for complete search history.

(56) References Cited

U.S. PATENT DOCUMENTS 6,016,476 A * 1/2000 Maes ................... G06Q 20/108
                                                   705/18
8,800,009 B1 * 8/2014 Beda, III ............ H04L 63/0846
                                                   713/155
2001/0039583 A1 * 11/2001 Nobakht ........... G06F 17/30884
                                                   709/227
2009/0193151 A1 * 7/2009 Adams ................... G06F 21/32
                                                   710/5
2010/0217709 A1 * 8/2010 Aabye ................... G06Q 20/10
                                                   705/44
2012/0284194 A1 * 11/2012 Liu ......................... G06Q 30/06
                                                   705/66
2013/0191279 A1 * 7/2013 Calman .............. G06Q 20/3226
                                                   705/41

FOREIGN PATENT DOCUMENTS

TW       201040870 A1    11/2010
WO           0235465 A1     5/2002
WO    WO 0235465 A1 *      5/2002    ........... G06K 19/077

OTHER PUBLICATIONS

Office Action and Search Report from TW application No. 104106100 dated Nov. 19, 2015.

* cited by examiner

*Primary Examiner* — Mary Li

(57) ABSTRACT

The disclosure provides a portable electronic card system and a method for manufacturing a rewritable plastic card. The portable electronic card system includes: a portable personal electronic device, a rewritable plastic card and a writing device. The portable personal electronic device is used for obtaining a certificated code and a personal information from a database by internet. The rewritable plastic card has a rewritable storage device for storing the personal information. The writing device electrically connects to the portable personal electronic device, and is used for writing the personal information into the rewritable plastic card.

8 Claims, 5 Drawing Sheets

PORTABLE ELECTRONIC CARD SYSTEM AND METHOD FOR MANUFACTURING A REWRITABLE PLASTIC CARD

BACKGROUND OF THE INVENTION

1. Field of the Invention

The present disclosure relates to a portable electronic card system and a method for manufacturing a rewritable plastic card.

2. Description of the Related Art

A credit card is a payment card issued to users as a system of payment. It allows the cardholder to pay for goods and services based on the holder's promise to pay for them. The issuer of the card creates a revolving account and grants a line of credit to the cardholder, thus the cardholder can borrow money for payment to a merchant or as a cash advance to the user. The bank manufactures the credit card according to the application of people. People usually have several credit cards issued from various banks. It is not convenient to carry lots of credit cards in the wallet.

SUMMARY OF THE INVENTION

The present disclosure provides a portable electronic card system. The portable electronic card system includes: a portable personal electronic device, a rewritable plastic card and a writing device. The portable electronic device is used for obtaining a certificated code and a personal information from a database by internet. The rewritable plastic card has a rewritable storage device for storing the personal information. The writing device electrically connects to the portable personal electronic device, and is used for writing the personal information into the rewritable plastic card.

The present disclosure further provides a method for manufacturing a rewritable plastic card. The method includes: obtaining a certificated code and a personal information from a database using a portable personal electronic device by internet; and writing the personal information into a rewritable plastic card using a writing device.

DETAILED DESCRIPTION OF THE INVENTION

Figure 1:
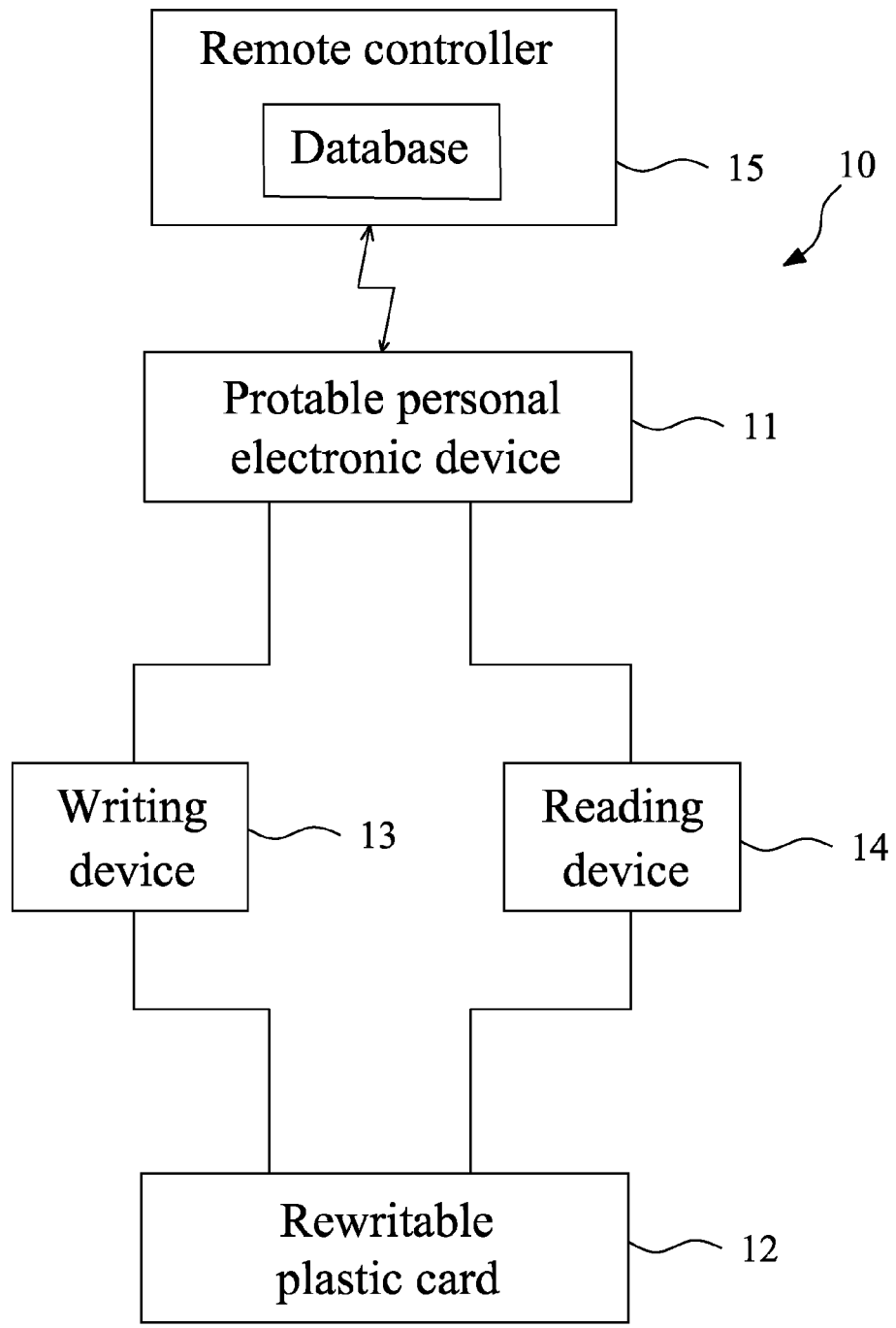
FIG. 1 is a schematic block diagram of a portable electronic card system in accordance with some embodiments.

Embodiments, or examples, of the disclosure illustrated in the drawings are now described using specific language. It will nevertheless be understood that no limitation of the scope of the disclosure is thereby intended. Any alterations and modifications in the described embodiments, and any further applications of principles described in this document are contemplated as would normally occur to one of ordinary skill in the art to which the disclosure relates. Reference numerals may be repeated throughout the embodiments, but this does not necessarily require that feature(s) of one embodiment apply to another embodiment, even if they share the same reference numeral. It will be understood that when an element is referred to as being "connected to" or "coupled to" another element, it may be directly connected to or coupled to the other element, or intervening elements may be present.

FIG. 1 is a schematic block diagram of a portable electronic card system in accordance with some embodiments. The portable electronic card system can be used for a credit card, a banking card, an automatic teller machine card, membership card, a private identification card, a debit card, a key card or a hybrid smart card. In an embodiment, the portable electronic card system 10 includes: a portable personal electronic device 11, a rewritable plastic card 12, a writing device 13 and a reading device 14. The portable personal electronic device 11 is used for obtaining a certificated code and a personal information from a database by internet. The portable personal electronic device 11 can be a smart phone, a tablet computer or a notebook computer.

Figure 2:
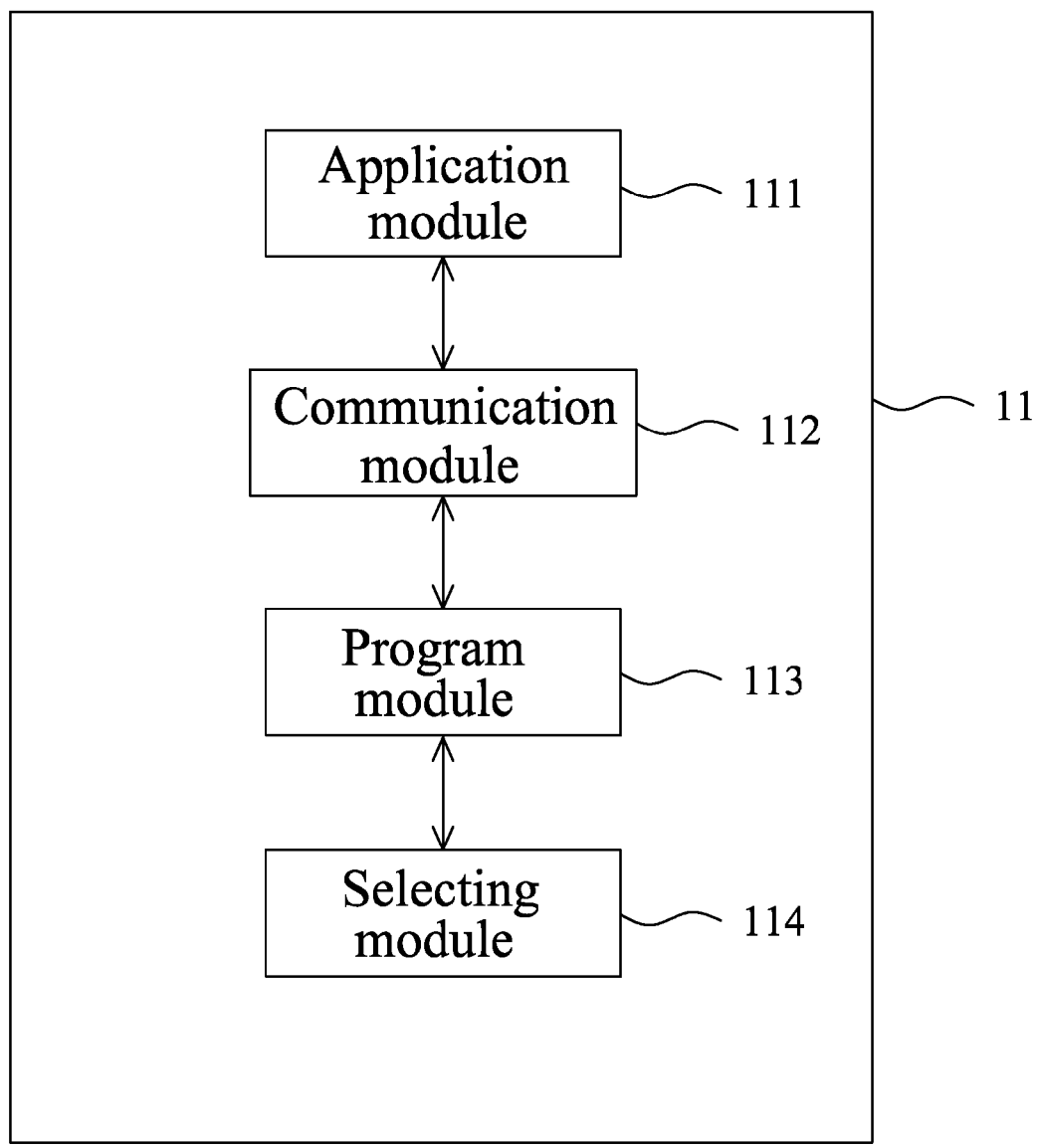
FIG. 2 is a schematic block diagram of a portable personal electronic device in accordance with some embodiments.

FIG. 2 is a schematic block diagram of a portable personal electronic device in accordance with some embodiments. Referring to FIG. 1 and FIG. 2, in an embodiment, the portable personal electronic device 11 includes an application module 111, a communication module 112, a program module 113 and a selecting module 114. For example, the portable electronic card system 10 is used for a credit card, people firstly submits an application data including personal data to a credit card company. The application module 111 is used for inputting the application data by the user. The communication module 112 is used for communicating with a remote controller 15 in the credit card company and transmitting the application data to the remote controller 15 by internet.

The credit card company verifies the application data after the credit card company receives the application data. Then, the remote controller 15 generates a password for the applicant after the remote controller 15 verifies the application data. The portable personal electronic device 11 receives the password from the remote controller 15. The program module 113 can be a software application used in the smart phone, tablet computer or notebook computer. The program module 113 can be used for inputting the password and transmitting the password to the remote controller 15. Then, the program module 113 is used for receiving the certificated code for the applicant from the remote controller 15 after the remote controller 15 verifies the password. The program module 113 can utilize the certificated code to communicate with the remote controller 15 and is used for downloading the personal information for the applicant after the remote controller 15 verifies the certificated code.

Furthermore, the portable personal electronic device 11 can download several personal information from several databases in several remote controllers of the various credit card companies according to the various applications of the user. Several downloaded personal information can be stored in the portable personal electronic device so that the user can the selecting module 114 of the portable personal electronic device 11 to select one of several personal information to be written into the rewritable plastic card 12.

The rewritable plastic card 12 has a rewritable storage device 121 for storing the personal information. The rewritable storage device 121 of the rewritable plastic card 12 can be at least one magnetic strip or at least one chip. The rewritable plastic card 12 can further includes a screen (not shown in the figures) for showing some information, for example, bank card number or username. The rewritable plastic card 12 can further includes a area for showing a picture of the user. The rewritable plastic card 12 can further have a bar code or QR code. The rewritable plastic card can be used for a credit card, a banking card, an automatic teller machine card, membership card, a private identification card, a debit card, a key card or a hybrid smart card.

The writing device 13 electrically connects to the portable personal electronic device 11, and is used for writing the personal information into the rewritable plastic card 12. In an embodiment, the writing device 13 electrically connects to the portable personal electronic device 11 by wireless communication. For example, the personal information from the remote controller 15 in the credit card company can be transmitted to the writing device 13, then be written into the rewritable plastic card 12 by the writing device 13. The rewritable plastic card 12 can be used as a credit card.

Figure 3:
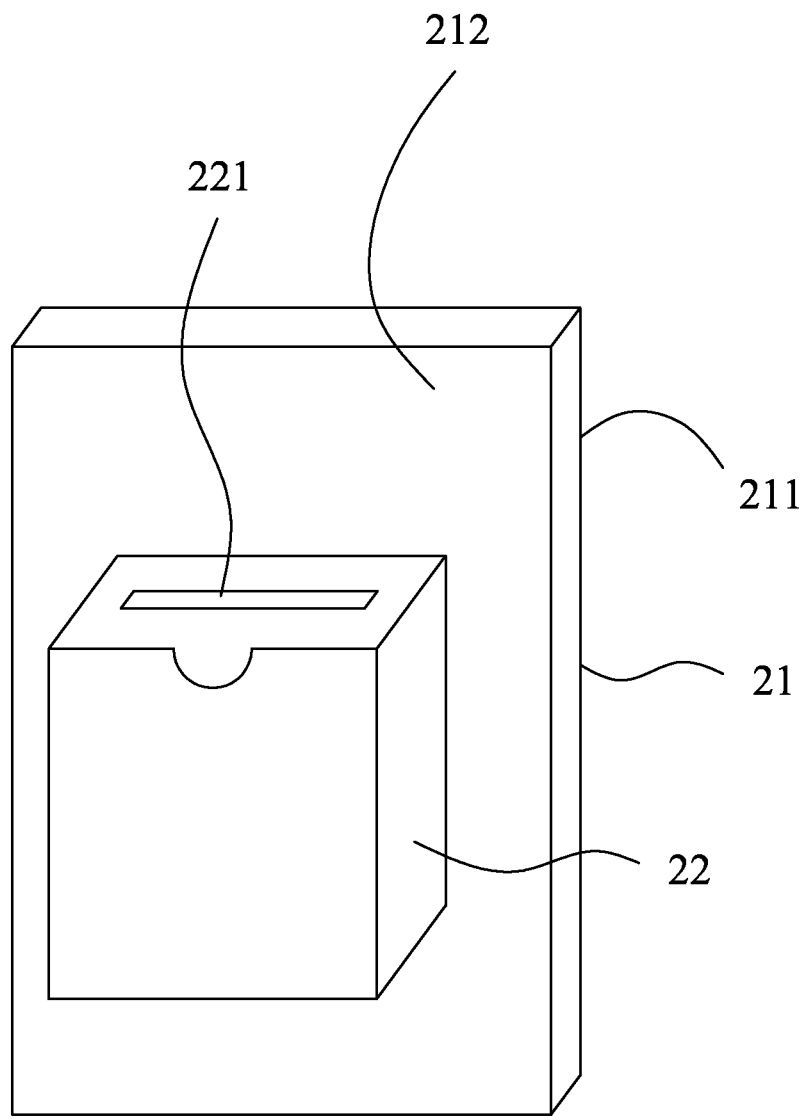
FIG. 3 shows the writing device and the portable personal electronic device in accordance with some embodiments.

FIG. 3 shows the writing device and the portable personal electronic device in accordance with some embodiments. In an embodiment, the portable personal electronic device 21 is a smart phone, and the portable personal electronic device 21 includes a front surface 211 and a back surface 212. The front surface 211 is a touch panel. The writing device 22 is mounted on the back surface 212, and is electrically connected to the portable personal electronic device 21. The writing device 22 includes a slot 221 for accommodating the rewritable plastic card. The rewritable plastic card can be disposed in the slot 221 to receive the personal information.

Using the portable electronic card system, the portable personal electronic device can obtain several personal information from several databases, then the writing device can write one of the several personal information into the rewritable plastic card according to the choice of the user. For example, if the user wants to use the credit card allowed by X credit card company, the user can utilizes the portable personal electronic device to select X personal information from X credit card company and transmit X personal information to the writing device. Then, the writing device writes X personal information into the rewritable plastic card. The rewritable plastic card can be used as a credit card allowed by X credit card company to pay for goods and services.

Furthermore, if the user wants to use the credit card allowed by Y credit card company, the user can utilizes the portable personal electronic device to select Y personal information from Y credit card company and transmit Y personal information to the writing device. Then, the writing device writes Y personal information into the rewritable plastic card and cover X personal information. The rewritable plastic card is changed as a credit card allowed by Y credit card company, and can be used to pay for goods and services.

Therefore, the rewritable plastic card can be used as a credit card allowed by various credit card companies. The user does not need to carry lots of credit cards, and can utilizes the rewritable plastic card of the portable electronic card system in place of several credit cards. Further, the rewritable plastic card can be configured to be a banking card, an automatic teller machine card, membership card, a private identification card, a debit card or a key card according to various personal information.

Referring to FIG. 1, the reading device 14 electrically connects to the portable personal electronic device 11, and is used for reading the personal information from the rewritable plastic card 12. In an embodiment, the reading device 14 electrically connects to the portable personal electronic device 11 by wireless communication. The personal information can be transmitted to the portable personal electronic device 11. The user can know the personal information in the rewritable plastic card 12 by the portable personal electronic device 11, and determine whether the personal information should be changed.

In an embodiment, the writing device 13 and the reading device 14 are embedded in the portable personal electronic device 11, and are parts of the portable personal electronic device 11. Referring to FIG. 3, the reading device can be embedded in the writing device 22, and is a part of the writing device 22. That is, the writing device 22 having the reading device can read the personal information in the rewritable plastic card.

Figure 4:
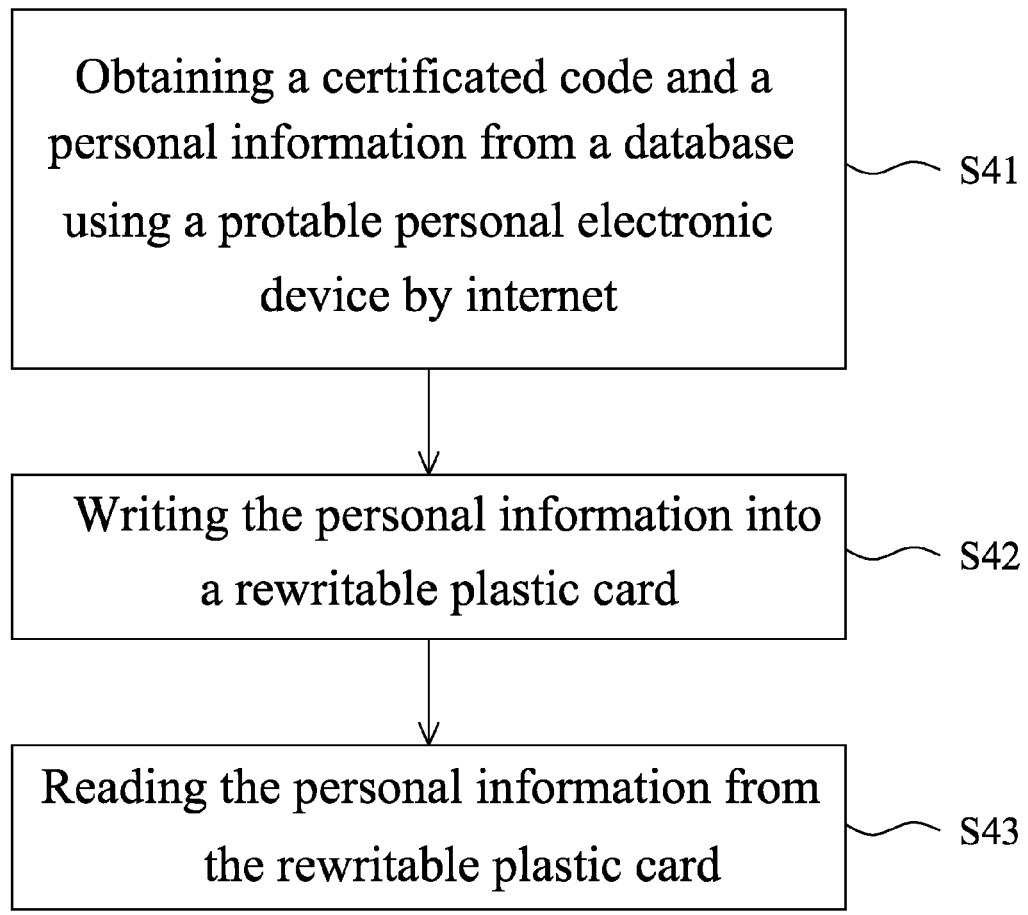
FIG. 4 is a flow diagram of a method for manufacturing a rewritable plastic card in accordance with some embodiments.

FIG. 4 is a flow diagram of a method for manufacturing a rewritable plastic card in accordance with some embodiments. Referring to step S41, a certificated code and a personal information are obtained from a database using a portable personal electronic device by internet. Referring to step S42, the personal information is written into a rewritable plastic card using a writing device. The rewritable plastic card having the personal information is performed. Referring to step S43, the method of the embodiment further includes reading the personal information from the portable electronic card.

Figure 5:
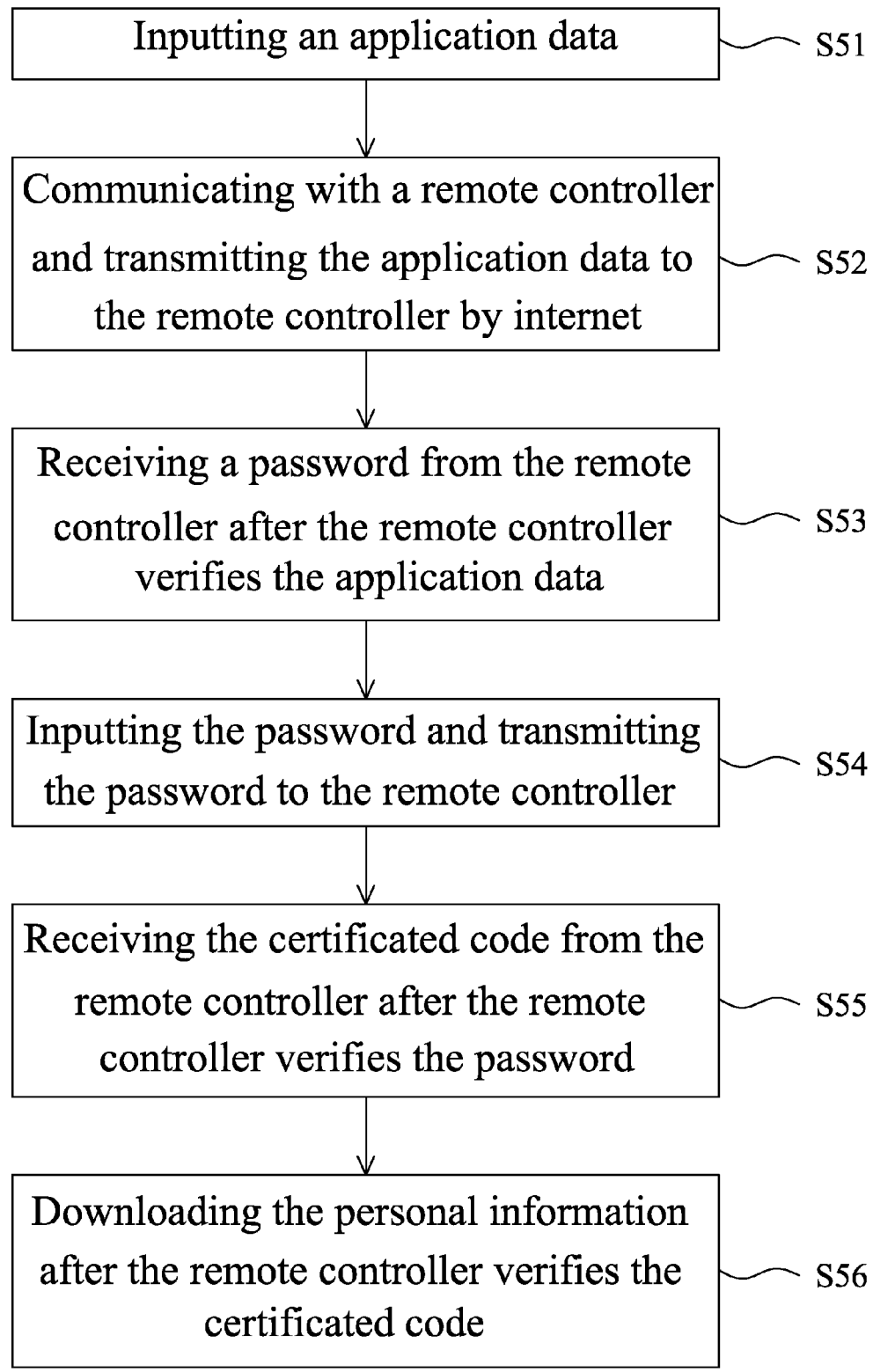
FIG. 5 is a flow diagram of a method for obtaining a personal information in accordance with some embodiments.

FIG. 5 is a flow diagram of a method for obtaining a personal information in accordance with some embodiments. Referring to step S51, the user inputs an application data by the portable personal electronic device or by filling in an application list. Referring to step S52, a remote controller is communicated and the application data is transmitted to the remote controller by internet. Referring to step S53, a password is received from the remote controller after the remote controller verifies the application data. Referring to step S54, the password is inputted and is transmitted the remote controller. Referring to step S55, the certificated code is received from the remote controller after the remote controller verifies the password. Referring to step S56, the personal information is downloaded after the remote controller verifies the certificated code. Therefore, the portable personal electronic device can obtain personal information from the remote controller, and the personal information is written into the rewritable plastic card.

While several embodiments of the present disclosure have been illustrated and described, various modifications and improvements can be made by those skilled in the art. The embodiments of the present disclosure are therefore described in an illustrative but not in a restrictive sense. It is intended that the present disclosure should not be limited to the particular forms as illustrated and that all modifications which maintain the spirit and scope of the present disclosure are within the scope defined in the appended claims.

What is claimed is:

1. A portable electronic card system, comprising:
   a smart phone or a tablet computer, for obtaining a certificated code and a personal information for writing into a rewritable plastic card from a database located out of the smart phone or the tablet computer by internet, the smart phone or the tablet computer comprising:
   an application module for inputting an application data by applicant in manual operation; and
   a communication module for communicating with a remote controller located out of the smart phone or the tablet computer and transmitting the application data to the remote controller by Internet, and then receiving a password from the remote controller when the application data be verified by the remote controller, wherein the password is originally unknown to applicant, the application data is originally known to applicant without any certificated code and being filled in an application list by applicant for recording in the smart phone or the tablet computer before communicating with the remote controller and transmitting the application data to the remote controller;

a program module used to input the password received from the remote controller and transmit the password to the remote controller, and then receiving the certificated code from the remote controller when the password be verified by the remote controller, and then transmitting the certificated code to the remote controller for verification, wherein the certificated code is originally unknown to applicant, wherein the personal information be downloaded to the smart phone or the tablet computer from the remote controller after verifications of the password and the certificated code originally unknown to applicant by the remote controller through a bidirectional verifying communication between the remote controller and the smart phone or the tablet computer and for storing the personal information and for transferring the personal information into the rewritable plastic card, wherein the bidirectional verifying communication comprising: when the smart phone or the tablet computer receives the password and the certificated code originally unknown to applicant, the program module feedbacks the password and the certificated code originally unknown to applicant to the remote controller for verification, the rewritable plastic card, having a rewritable storage device for storing the personal information;

a writing device, electrically connecting to the smart phone or the tablet computer and writing the personal information; and a reading device, electrically connecting to the smart phone or the tablet computer and reading the personal information from the rewritable plastic card;

wherein the writing device and the reading device are embedded in the smart phone or the tablet computer.

2. The portable electronic card system according to claim 1, wherein the database is installed in the remote controller.

3. The portable electronic card system according to claim 1, wherein the smart phone or the tablet computer stores a plurality of personal information, the smart phone or the tablet computer further comprises a selecting module for selecting one of the personal information.

4. The portable electronic card system according to claim 1, wherein the rewritable storage device of the rewritable plastic card comprises at least one magnetic strip or at least one chip.

5. The portable electronic card system according to claim 1, wherein the writing device comprises a slot for accommodating the rewritable plastic card.

6. The portable electronic card system according to claim 1, wherein the rewritable plastic card is used for a credit card, a banking card, an automatic teller machine card, membership card, a private identification card, a debit card or a key card.

7. The portable electronic card system according to claim 1, wherein the rewritable plastic card further comprises a screen.

8. A method for manufacturing a rewritable plastic card, comprising:

(a) obtaining a certificated code and a personal information for writing into a rewritable plastic card from a database of a remote controller located out of a smart phone or a tablet computer by using the smart phone or the tablet computer by internet, and using an application module located inside of the smart phone or the tablet computer to input an application data by applicant in manual operation, and using a communication module located inside of the smart phone or the tablet computer to communicate with the remote controller and transmit the application data to the remote controller by Internet, and then receiving a password originally unknown to applicant from the remote controller after the remote controller verifies the application data, and using a program module located inside of the smart phone or the tablet computer to input the password received from the remote controller and transmit the password to the remote controller, and receiving the certificated code originally unknown to applicant from the remote controller after the remote controller verifies the password, and transmitting the certificated code to the remote controller for verification, wherein the application data being without any certificated code and being filled in an application list by applicant for recording in the smart phone or the tablet computer before communicating with the remote controller and transmitting the application data to the remote controller;

wherein the personal information be downloaded to the smart phone or the tablet computer from the remote controller after verifications of the password and the certificated code originally unknown to applicant by the remote controller through a bidirectional verifying communication between the remote controller and the smart phone or the tablet computer, and for storing the personal information into the program module and for transferring the personal information into the rewritable plastic card by the program module, wherein the bidirectional verifying communication comprising: when the smart phone or the tablet computer receives the password and the certificated code originally unknown to applicant, the program module feedbacks the password and the certificated code originally unknown to applicant to the remote controller for verification, (b) writing the personal information from the program module into the rewritable plastic card by using a writing device; and (c) reading the personal information from the rewritable plastic card by using a reading device.

* * * * *